US012775676B2

(12) United States Patent
Dupont de Dinechin et al.

(10) Patent No.: US 12,775,676 B2
(45) Date of Patent: Oct. 27, 2026

(54) SYSTEM FOR PROCESSING MATRICES USING MULTIPLE PROCESSORS SIMULTANEOUSLY

(71) Applicant: Kalray, Montbonnot Saint Martin (FR)

(72) Inventors: Benoit Dupont de Dinechin, Grenoble (FR); Julien Le Maire, La Tronche (FR); Nicolas Brunie, Grenoble (FR)

(73) Assignee: Kalray, Montbonnot Saint Martin (FR)

( * ) Notice: Subject to any disclaimer, the term of this patent is extended or adjusted under 35 U.S.C. 154(b) by 1338 days.

(21) Appl. No.: 17/566,562

(22) Filed: Dec. 30, 2021

(65) Prior Publication Data

US 2022/0207108 A1 Jun. 30, 2022

(30) Foreign Application Priority Data

Dec. 31, 2020 (FR) ....................................... 2014301

(51) Int. Cl.
*G06F 17/16* (2006.01)

(52) U.S. Cl.
CPC .................................... *G06F 17/16* (2013.01)

(58) Field of Classification Search
CPC .......... G06F 17/16; G06F 9/3885; G06F 7/57; G06F 9/3881; G06F 9/3001; G06F 7/78; G06F 2207/3892; G06F 15/8046
See application file for complete search history.

(56) References Cited

U.S. PATENT DOCUMENTS

2008/0250227 A1 10/2008 Linderman et al.
2015/0339256 A1* 11/2015 Dupont De Dinechin .................. G06F 15/17325 712/29
2018/0189236 A1* 7/2018 Korthikanti .............. G06N 3/09
2018/0267936 A1* 9/2018 Chen ........................ G06F 17/16
2020/0050451 A1 2/2020 Babich et al.
(Continued)

FOREIGN PATENT DOCUMENTS

EP 3343387 A1 7/2018

OTHER PUBLICATIONS

Libretexts. (May 18, 2020). 4.12: Tuples vs. lists, immutable vs. mutable. Engineering LibreTexts. https://eng.libretexts.org/Bookshelves/Computer_Science/Programming_Languages/Making_Games_with_Python_and_Pygame_(Sweigart)/04%3A_Memory_Puzzle/4.12%3A_Tuples_vs._Lists%2C_Immutable_vs._Mutable (Year: 2020).*
(Continued)

*Primary Examiner* — Emily E Larocque
*Assistant Examiner* — Jerome Anthony Klosterman, II

(57) ABSTRACT

A method is disclosed for block processing two matrices stored in a same shared memory, one being stored by rows and the other being stored by columns, using a plurality of processing elements (PE), where each processing element is connected to the shared memory by a respective N-bit access and to a first adjacent processing element by a bidirectional N-bit point-to-point link. The method comprising the following steps carried out in one processor instruction cycle: receiving in the processing elements respective different N-bit segments of a same one of the two matrices by the respective memory accesses; and exchanging with the first adjacent processing element, by means of the point-to-point link, N-bit segments of a first of the two matrices which were received in the adjacent processing elements in a previous instruction cycle.

9 Claims, 4 Drawing Sheets

(56) References Cited

U.S. PATENT DOCUMENTS

| | | | |
|---|---|---|---|
| 2020/0201642 A1 | 6/2020 | Dupont de Dinechin et al. | |
| 2022/0171605 A1* | 6/2022 | Willcock | G06F 7/5443 |

OTHER PUBLICATIONS

Tuple. Wikipedia. (n.d.). https://web.archive.org/web/20201101021530/https://en.wikipedia.org/wiki/Tuple (Year: 2020).*

Search Report dated Sep. 23, 2021, in connection with French Application No. FR2014301, 9 pages.

* cited by examiner

Fig. 4

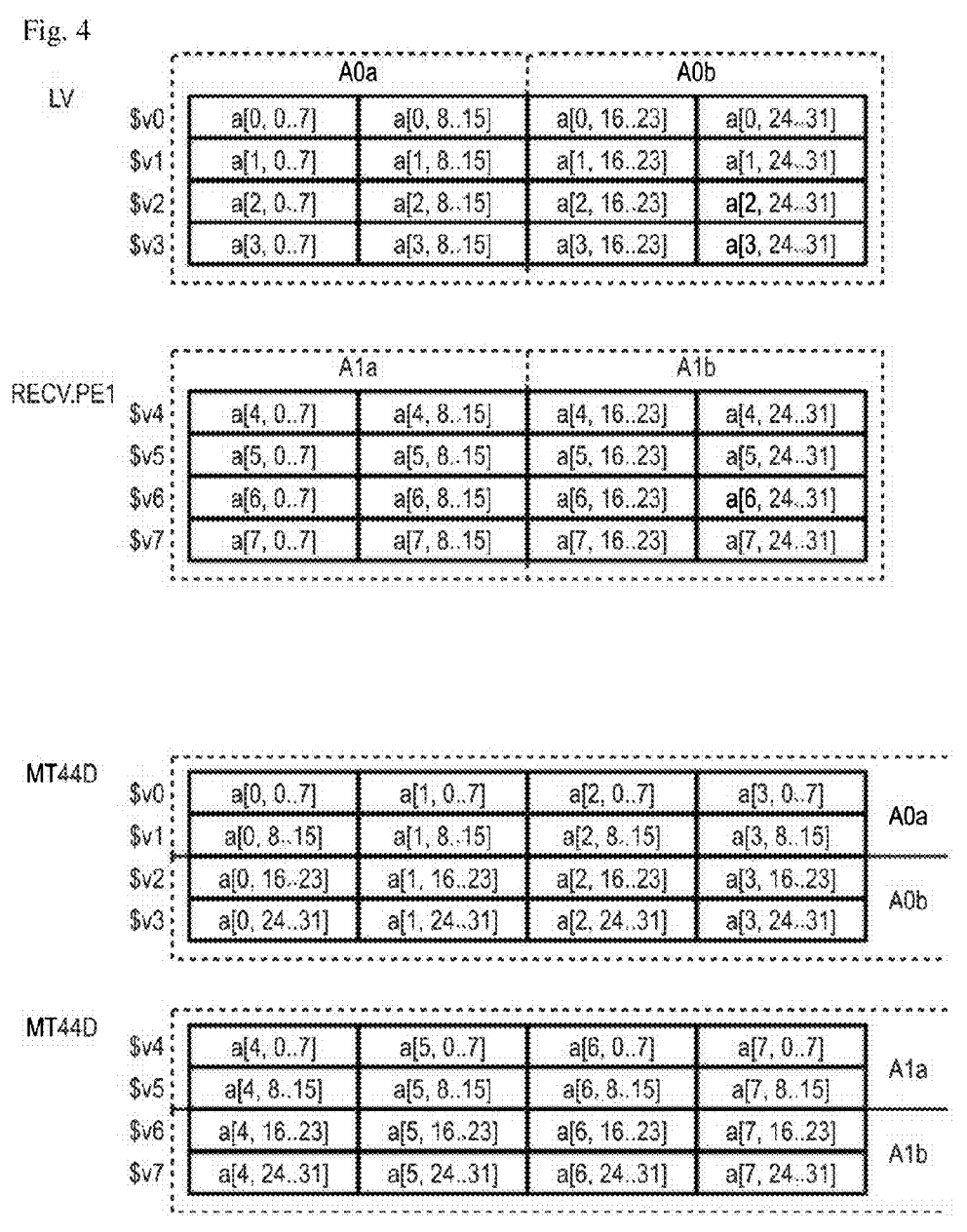

LV

| | A0a | | A0b | |
|---|---|---|---|---|
| $v0 | a[0, 0..7] | a[0, 8..15] | a[0, 16..23] | a[0, 24..31] |
| $v1 | a[1, 0..7] | a[1, 8..15] | a[1, 16..23] | a[1, 24..31] |
| $v2 | a[2, 0..7] | a[2, 8..15] | a[2, 16..23] | a[2, 24..31] |
| $v3 | a[3, 0..7] | a[3, 8..15] | a[3, 16..23] | a[3, 24..31] |

RECV.PE1

| | A1a | | A1b | |
|---|---|---|---|---|
| $v4 | a[4, 0..7] | a[4, 8..15] | a[4, 16..23] | a[4, 24..31] |
| $v5 | a[5, 0..7] | a[5, 8..15] | a[5, 16..23] | a[5, 24..31] |
| $v6 | a[6, 0..7] | a[6, 8..15] | a[6, 16..23] | a[6, 24..31] |
| $v7 | a[7, 0..7] | a[7, 8..15] | a[7, 16..23] | a[7, 24..31] |

MT44D

| | | | | | |
|---|---|---|---|---|---|
| $v0 | a[0, 0..7] | a[1, 0..7] | a[2, 0..7] | a[3, 0..7] | A0a |
| $v1 | a[0, 8..15] | a[1, 8..15] | a[2, 8..15] | a[3, 8..15] | |
| $v2 | a[0, 16..23] | a[1, 16..23] | a[2, 16..23] | a[3, 16..23] | A0b |
| $v3 | a[0, 24..31] | a[1, 24..31] | a[2, 24..31] | a[3, 24..31] | |

MT44D

| | | | | | |
|---|---|---|---|---|---|
| $v4 | a[4, 0..7] | a[5, 0..7] | a[6, 0..7] | a[7, 0..7] | A1a |
| $v5 | a[4, 8..15] | a[5, 8..15] | a[6, 8..15] | a[7, 8..15] | |
| $v6 | a[4, 16..23] | a[5, 16..23] | a[6, 16..23] | a[7, 16..23] | A1b |
| $v7 | a[4, 24..31] | a[5, 24..31] | a[6, 24..31] | a[7, 24..31] | |

Fig. 5

| | PE0 | | | | | |
|---|---|---|---|---|---|---|
| Cyc | LSU | ALU0 | ALU1 | BCU | Copro. | Op. |
| 1 | LV $v0 = a[0,0..31] | | | | | |
| 2 | LV $v1 = a[1,0..31] | | | | | |
| 3 | LV $v2 = a[2,0..31] | | | | | |
| 4 | LV $v3 = a[3,0..31] | | | | | A0ab |
| 5 | LV $v8 = b[0..31,0] | RECV.PE1 $v4 (a[4,0..31]) | SEND.PE1 $v0 (a[0,0..31]) | | | |
| 6 | LV $v9 = b[0..31,1] | RECV.PE1 $v5 (a[5,0..31]) | SEND.PE1 $v1 (a[1,0..31]) | | | |
| 7 | LV $v10 = b[0..31,2] | RECV.PE1 $v6 (a[6,0..31]) | SEND.PE1 $v2 (a[2,0..31]) | | | |
| 8 | LV $v11 = b[0..31,3] | RECV.PE1 $v7 (a[7,0..31]) | SEND.PE1 $v3 (a[3,0..31]) | | | B0ab, A1ab |
| 9 | LV [32..63] | RECV.PE2 $v12 (b[0..31,4]) | SEND.PE2 $v8 (b[0..31,0]) | | | |
| 10 | LV [32..63] | RECV.PE2 $v13 (b[0..31,5]) | SEND.PE2 $v9 (b[0..31,2]) | | | |
| 11 | LV [32..63] | RECV.PE2 $v14 (b[0..31,6]) | SEND.PE2 $v10 (b[0..31,2]) | | | |
| 12 | LV [32..63] | RECV.PE2 $v15 (b[0..31,7]) | SEND.PE2 $v11 (b[0..31,3]) | | | B2ab |
| 13 | LV [32..63] | RECV [32..63] | SEND [32..63] | MT44D $v0v1v2v3 = $v0v1v2v3 | | A0a, A0b |
| 14 | LV [32..63] | RECV [32..63] | SEND [32..63] | MT44D $v4v5v6v7 = $v4v5v6v7 | | A1a, A1b |
| 15 | LV [32..63] | RECV [32..63] | SEND [32..63] | MT44D $v8v9v10v11 = $v8v9v10v11 | | B0a, B0b |
| 16 | LV [32..63] | RECV [32..63] | SEND [32..63] | MT44D $v12v13v14v15 = $v12v13v14v15 | | B2a, B2b |
| 17 | | RECV [32..63] | SEND [32..63] | | MMA4164 $v40v41 += $v0v1, $v8v9 | A0a * B0a |
| 18 | | RECV [32..63] | SEND [32..63] | | MMA4164 $v40v41 += $v2v3, $v10v11 | A0b * B0b |
| 19 | | RECV [32..63] | SEND [32..63] | | MMA4164 $v42v43 += $v0v1, $v12v13 | A0a * B2a |
| 20 | | RECV [32..63] | SEND [32..63] | | MMA4164 $v42v43 += $v2v3, $v14v15 | A0b * B2b |
| 21 | | | | MT44D | MMA4164 $v44v45 += $v4v5, $v8v9 | A1a * B0a |
| 22 | | | | MT44D | MMA4164 $v44v45 += $v6v7, $v10v11 | A1b * B0b |
| 23 | | | | MT44D | MMA4164 $v46v47 += $v4v5, $v12v13 | A1a * B2a |
| 24 | | | | MT44D | MMA4164 $v46v47 += $v6v7, $v14v15 | A1b * B2b |
| 25 | | | | | MMA4164 | |
| 26 | | | | | MMA4164 | |
| 27 | | | | | MMA4164 | |
| 28 | | | | | MMA4164 | |
| 29 | | | | | MMA4164 | |
| 30 | | | | | MMA4164 | |
| 31 | | | | | MMA4164 | |
| 32 | | | | | MMA4164 | |

SYSTEM FOR PROCESSING MATRICES USING MULTIPLE PROCESSORS SIMULTANEOUSLY

CROSS-REFERENCE TO RELATED APPLICATION

This application is based on and claims priority under 35 U.S.C. § 119 to French Patent Application No. 20 14301 filed on Dec. 31, 2020, the disclosure of which is herein incorporated by reference in its entirety.

FIELD

The disclosure relates to the multiplication of matrices of digitally represented numbers, in particular to processors assisted by specialized hardware accelerators for matrix operations.

BACKGROUND

Artificial intelligence technologies, especially deep learning, are particularly demanding in terms of multiplications of large matrices, which can have several hundred rows and columns. Hardware accelerators specialized in matrix multiplications are thus emerging.

Multiplication of large matrices is usually done in blocks, i.e., by decomposing the matrices into sub-matrices of a size suitable for the computing resources. Accelerators are thus designed to efficiently compute the products of these sub-matrices.

Hardware accelerators dedicated to matrix multiplication face challenges related to supplying the accelerator's compute units with matrix data stored in shared memory, without causing compute unit starvation or underutilization. For example, the format of data storage in memory may not match the format required by the compute units, so that latency and data buffers may be introduced to reorder the data.

Patent application US2020/0201642 by Kalray discloses a processor architecture incorporating a tightly coupled coprocessor including its own register file and implementing a special mechanism for transferring data between memory and the coprocessor registers. The processor is able, thanks to a dedicated instruction set, to use the memory bandwidth in an optimal way throughout the processing of two matrices to be multiplied.

However, challenges arise in terms of memory bandwidth optimization when parallelizing of the processing is sought, i.e., using several processors in parallel to process the same multiplication of matrices.

SUMMARY

A method is generally provided for block processing two matrices stored in a same shared memory, one being stored by rows and the other being stored by columns, using a plurality of processing elements, where each processing element is connected to the shared memory by a respective N-bit access and to a first adjacent processing element by a bidirectional N-bit point-to-point link. The method comprises the following steps carried out in one processor instruction cycle: receiving in the processing elements respective different N-bit segments of a same one of the two matrices by the respective memory accesses; and exchanging with the first adjacent processing element, by means of the point-to-point link, N-bit segments of a first of the two matrices which were received in the adjacent processing elements in a previous instruction cycle.

According to an embodiment, each processing element is connected to a second adjacent processing element by a respective bidirectional N-bit point-to-point link. The method comprises the following steps performed in a subsequent instruction cycle: receiving in the processing elements respective different N-bit segments of a same one of the two matrices by the respective memory accesses; and exchanging with the second adjacent processing element, by means of the point-to-point link, N-bit segments of the second of the two matrices which were received in the adjacent processing elements in a previous instruction cycle.

Each received N-bit segment may contain M rows or columns belonging respectively to M submatrices of N bits, each submatrix having an even number R of rows or columns, where R is divisible by M. The method then comprises the following steps: repeating the receiving or exchanging step R times and storing the resulting R received segments in R respective tuples of N-bit registers, whereby each of the R tuples contains M rows or columns respectively belonging to M submatrices; transposing the contents of the R tuples so that each of the M submatrices is entirely contained in a group of R/M tuples; and operating on each submatrix individually using the R/M tuples containing it as an operand of an execution unit.

A processor is also provided, comprising a plurality of Very large Instruction Word processing elements; a shared memory connected to each processing element by a respective port; a bidirectional point-to-point link connecting two adjacent processing elements. Each processing element has a memory access management unit and two arithmetic and logic units capable of simultaneously executing respective instructions contained in a VLIW instruction packet. A first of the arithmetic and logic units is configured to respond to a data receive instruction by storing in a local register identified by a parameter, data presented on an incoming channel of the point-to-point link. A second of the arithmetic and logic units is configured to respond to a data send instruction by writing into an outgoing channel of the point-to-point link the contents of a local register identified by a parameter.

The processor may comprise for each channel of the point-to-point link a FIFO buffer, the first arithmetic and logic unit of a processing element being configured to, in response to the receive instruction, retrieve current data from the FIFO memory of the incoming channel; and the second arithmetic and logic unit of a processing element being configured to, in response to the send instruction, stack the contents of the local register in the FIFO memory of the outgoing channel.

BRIEF DESCRIPTION OF THE DRAWINGS

Embodiments will be exposed in the following description provided for exemplary purposes only, in relation to the appended figures, among which:

FIG. 4 illustrates the register contents of a processing element during two processing phases.

FIG. 5 illustrates the three phases of FIGS. 3A to 3C as VLIW instruction cycles executed in a processing element.

DETAILED DESCRIPTION

Figure 1:
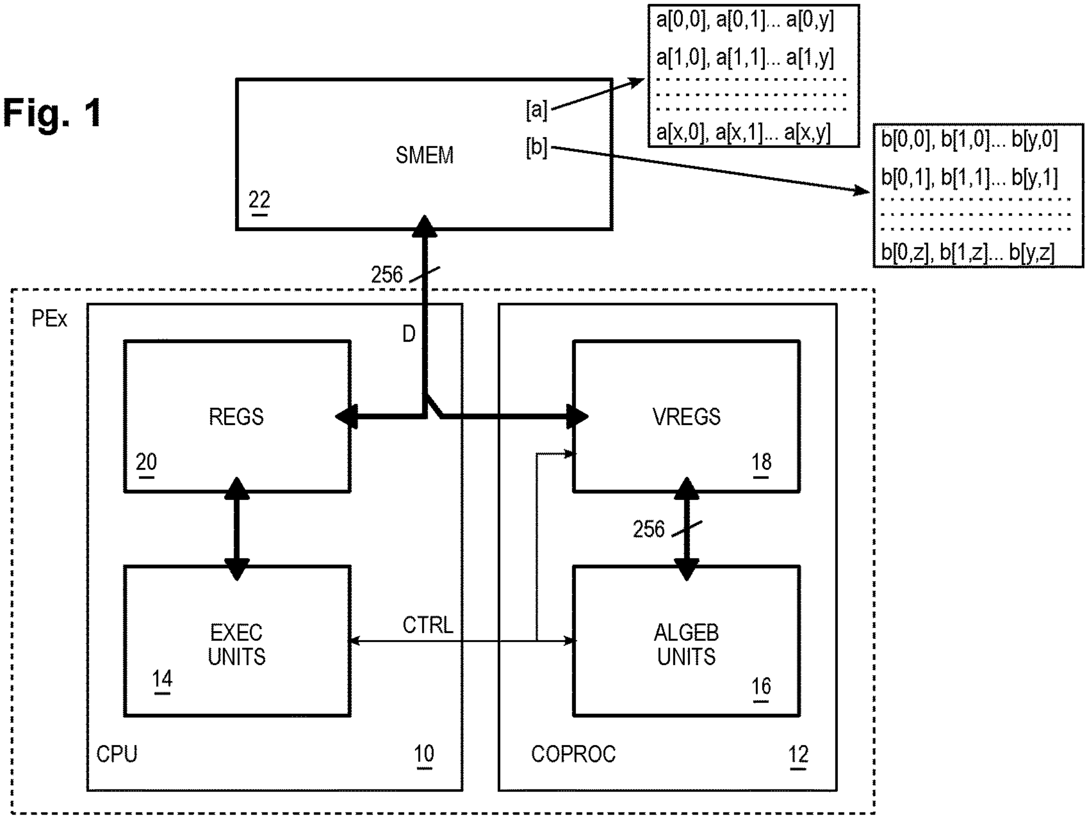
FIG. 1 is a block diagram of a processor integrating a coprocessor strongly coupled to a central processing unit.

FIG. 1 is a block diagram of a processor architecture as disclosed in the aforementioned patent application US2020/0201642. It includes a generic central processing unit (CPU) 10 strongly coupled to a coprocessor 12 integrating hardware operators dedicated to the calculation of matrix products. By "strong coupling" it is understood that the coprocessor obeys cycle by cycle machine instructions that are executed in the CPU and implemented by hardware execution units 14.

More specifically, some machine instructions in the processor instruction set incorporate commands dedicated to the coprocessor. When these instructions reach a corresponding execution unit 14 of the CPU, the execution unit configures the coprocessor operation through control lines CTRL. The coprocessor is wired to immediately obey the signals presented on these control lines. In fact, the coprocessor is an extension of the execution units 14 of the CPU, obeying an extension of a set of generic instructions of the processor. Thus, apart from adapting the execution units to the coprocessor control, the CPU 10 may be of a generic type, allowing in particular to execute an operating system or a program compiled from a generic programming language.

Coprocessor 12 includes algebraic computation units 16, including hardware operators dedicated to the calculation of matrix multiplication. The coprocessor also integrates its own set of working registers, or register file 18, independent of a conventional register file 20 of the CPU 10.

Register files 18 and 20 are connected to a shared memory 22 by an N-bit data bus D. Address and memory control buses, obeying conventional CPU execution units, are not shown. The registers 18 of the coprocessor have the same size N as the data bus and are configured to obey commands from an execution unit 14 of the CPU.

Two matrices to be multiplied [a] and [b] are initially stored in shared memory 22. Depending on the programming language used, a matrix is stored by default in row-major format, i.e., elements of a same row are located at consecutive addresses, or in column-major format, i.e., elements of a same column are located at consecutive addresses. The C programming language uses the first format, while Fortran uses the second format. In any case, standard linear algebra libraries (BLAS) used by these programming languages provide transposition parameters to switch a matrix from one format to another as required by the calculations.

For the needs of the present architecture, the two matrices to be multiplied are stored in complementary formats, for example the first matrix [a] is stored in row-major format, while the second matrix [b] is stored in column-major format. The matrix [b] is thus stored in transposed form. FIG. 1 illustrates the memory content for a matrix [a] of x+1 rows and y+1 columns and a matrix [b] of y+1 rows and z+1 columns. The matrix [b], having a number of rows equal to the number of columns of the matrix [a], can be multiplied by the matrix [a].

In the result matrix [c] which has x+1 rows and z+1 columns, each of the elements c[i, j] is the dot product of the row of rank i of matrix [a] and the column of rank j of matrix [b], where the rows and columns are considered vectors of y+1 components, namely:

$$c[i,j]=a[i,0\ .\ .\ .\ y]-b[0\ .\ .\ .\ y,j]$$

The coprocessor 12 is designed to multiply, in a fully hardware manner, two sub-matrices of the source matrices, the first submatrix [A] having a fixed number R of rows, and the second submatrix [B] having a fixed number Q of columns. The remaining dimension P of the submatrices, which will be referred to as "depth" hereafter, is configurable according to the format of the elements of the matrices and the area or power budget allocated to the hardware operators. The multiplication of these submatrices thus produces a result submatrix [C] of R×Q elements.

Assuming for the moment that R equals Q, this number together with P determine the hardware resources needed to perform the multiplication. For artificial intelligence applications, the value P=16 offers an interesting compromise and will be used as an example in the following. Indeed, artificial intelligence computations tend to use mixed precision matrix multiplications, where the elements of the matrices to be multiplied fit on 8 or 16 bits, rarely 32 bits, while the elements of the result matrices fit on 32 or 64 bits, in floating point, fractional or integer representation. The small precisions of the matrices to be multiplied reduce the complexity of the operators and allow greater depths P than those required to handle "single precision" and "double precision" floating point numbers conventionally used in generic CPUs, and coded on 32 and 64 bits respectively.

Furthermore, each submatrix to be multiplied is considered to have an overall size multiple of N bits, where N is the size of the data bus D, which will be assumed to be 256 bits as an example in the following. This leads to practical cases where the submatrices have R=4 rows or columns with a depth of 64 bits or a multiple of 64 bits. This depth is occupied, depending on the application, by bytes or words of 16 to 64 bits. These can be integers or fixed or floating-point numbers.

If it is desired to process several sub-matrix products in parallel, it would be natural to use several processors of the type shown in FIG. 1. However, the computing power is not systematically multiplied by the number of parallelized processors, because also the memory bandwidth increases due to certain characteristics of a matrix multiplication, which imply that each processor operates on the same data as its neighbors More specifically, two processors that each compute a submatrix in the same group of rows of the result matrix each use a source submatrix also used by the other. In other words, the same submatrix is used twice, once by each processor, which may involve two reads of each submatrix from memory. The same is true when two processors compute on the same group of columns. In the best case, the total amount of memory reads for a product of an R×P matrix by a P×Q matrix increases proportionally to the square root of the number of processors: R×P+P×Q for one processor, 4×(R/2×P+P×Q/2) for four processors, 16×(R/4×P+P×Q/4) for sixteen processors, etc.

Figure 2:
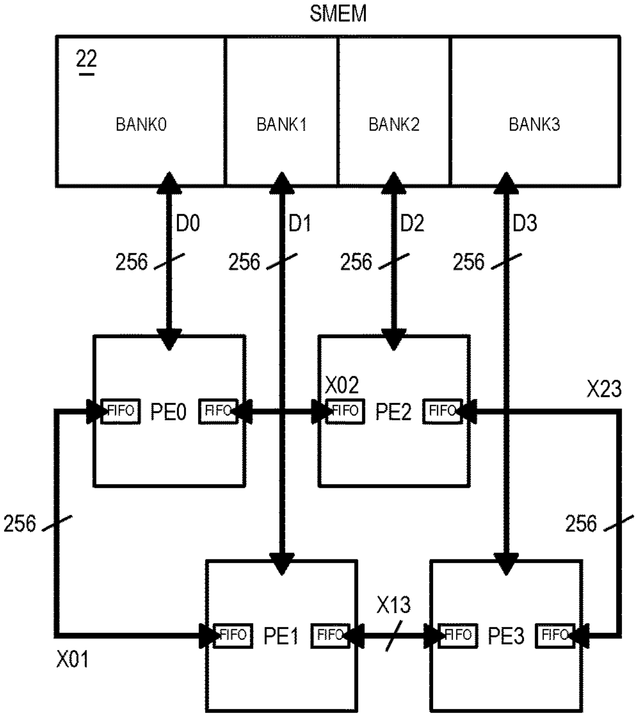
FIG. 2 is a block diagram of an embodiment of a processor architecture offering a four-fold increase of computational power in performing submatrix products.

FIG. 2 is a block diagram of an embodiment of a processor architecture allowing a four-fold power increase for computing submatrix products while only increasing the memory bandwidth by a factor of four, whereas a conventionally optimized embodiment would require multiplying this bandwidth by eight.

The processor includes four processing elements PE0 to PE3, each of which may have the structure of the processor of FIG. 1. Each processing element is connected to the shared memory 22 by a respective independent data bus D0-D3 of N=256 bits. The memory 22 need not have a full quadruple access structure, i.e., where each of the buses D0-D3 provides access to the entire memory. Indeed, as will be seen below, no processing element will require access to the memory for data used by another processing element. Thus, the memory 22 can be of a 4-bank structure (BANK0, BANK1, BANK2, BANK3 in FIG. 2), significantly simpler to implement than a full quadruple-access memory.

Furthermore, the processing elements are connected in a ring via bidirectional point-to-point links of N=256 bits, namely a link X01 between the elements PE0 and PE1, X02 between the elements PE0 and PE2, X13 between the elements PE1 and PE3, and X23 between the elements PE2 and PE3.

Each of the point-to-point links is connected to its two adjacent processing elements, more specifically to the register files 18 of those processing elements, so that a processing element can transfer the contents of any of its registers 18 to any register 18 of one of the adjacent processing elements.

Such a transfer may be coordinated by the execution in one of the processing elements of a send instruction noted "SEND.PE $v", where PE designates the target processing element (in fact the X-link to be used) and $v the local register whose content (in practice a vector) is to be sent. The target processing element executes a complementary receive instruction noted "RECV.PE $v", where PE designates the source processing element (in fact the X link to be used) and $v the local register where the transferred data is to be stored.

The SEND and RECV instructions may be implemented similarly to "PUSH" and "POP" instructions which are typically used to manage a FIFO buffer. Each channel of a point-to-point link is then provided with a FIFO memory (FIFO in FIG. 2). In this case, a RECV instruction causes the current data to be read from the FIFO memory of the incoming channel, and a SEND instruction causes the data to be stacked in the FIFO memory of the outgoing channel. In this case, depending on the size of the FIFOs, SEND and RECV instructions executed on adjacent processing elements may be executed several cycles apart without triggering a wait between these processing elements. If a RECV instruction is executed too early (when the FIFO memory of the incoming channel is empty), the processing element is put on hold. If a SEND instruction is executed while the outgoing channel FIFO is full, the processing element is also put on hold.

Figure 3A:
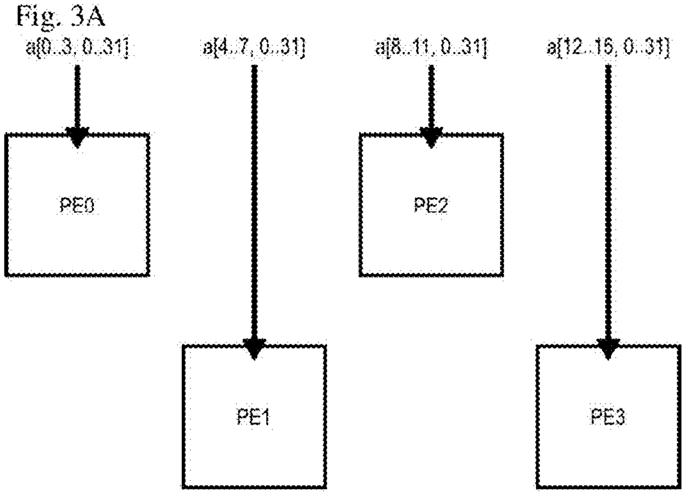
FIGS. 3A to 3C illustrate a complete data exchange cycle in the structure of FIG. 2.
Figure 3B:
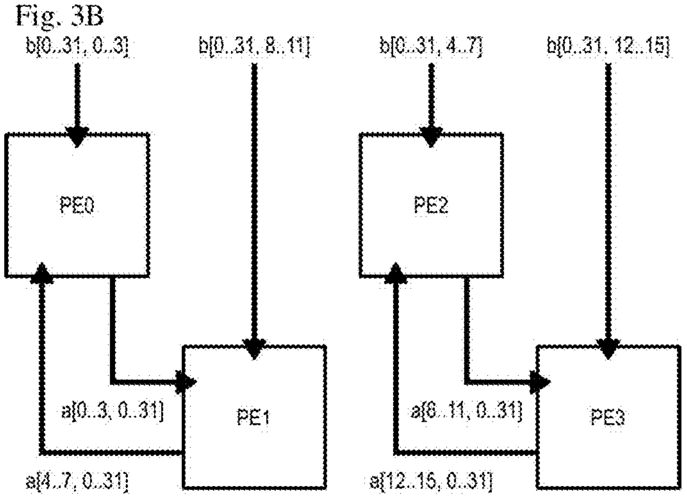
Figure 3C:
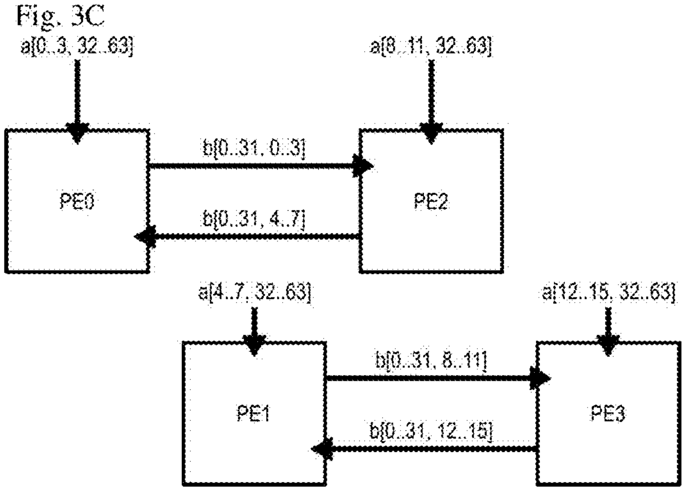

FIGS. 3A to 3C illustrate a complete data exchange cycle in the structure of FIG. 2, in processing 16 row segments of 256 bits of matrix [a] and 16 column segments of 256 bits of matrix [b]. The 256 bits in each segment are grouped by bytes numbered [0 . . . 31].

In FIG. 3A, in a first phase, each of the processing elements PE0 to PE3 receives in parallel from memory a block of four segments, respectively a[0 . . . 3, 0 . . . 31], a[4 . . . 7, 0 . . . 31], a[8 . . . 11, 0 . . . 31], and a[12 . . . 15, 0 . . . 31]. Since each segment is the size of the data bus, this phase actually takes four memory read cycles.

In FIG. 3B, in a second phase that may immediately follow the first phase, each of the processing elements PE0 to PE3 receives in parallel from memory a block of four segments, respectively b[0 . . . 31, 0 . . . 3], b[0 . . . 31, 8 . . . 11], b [0 . . . 31, 4 . . . 7], and b[0 . . . 31, 12 . . . 15]. Since each segment is the size of the data bus, this phase also takes four memory read cycles.

During this second phase, vertically adjacent processing elements exchange the segments of the matrix [a], received in the previous phase, through their corresponding point-to-point links. Specifically, processing elements PE0 and PE1 exchange segments a[0 . . . 3, 0 . . . 31] and a[4 . . . 7, 0 . . . 31], and processing elements PE2 and PE3 exchange segments a[8 . . . 11, 0 . . . 31] and a[12 . . . 15, 0 . . . 31]. These segment exchanges, given the 256-bit size of the point-to-point links, also take four cycles.

Thus, during this phase, four segment read cycles and four segment exchange cycles take place in each processing element. However, since read cycles and exchange cycles do not occur on the same communication channels, exchange cycles can occur at the same time as read cycles. This is made possible by using a processing element architecture that can execute multiple operations at the same time, such as a VLIW (Very Long Instruction Word) core architecture, where read operations and exchange operations can be implemented by two independent execution units, each responding in parallel to a dedicated instruction. As a result, the second phase may take as few as four cycles.

In this second phase other independent execution units, controlled in parallel by other VLIW instructions, may also be involved to perform calculations involving the matrix data present in the processing elements, as will be illustrated later, so that there is no dead time in the occupation of the memory buses, and without reading the same data from memory multiple times.

In FIG. 3C, in a third phase that may immediately follow the second phase, horizontally adjacent processing elements exchange matrix segments [b], received in the previous phase, through their corresponding point-to-point links. Specifically, processing elements PE0 and PE2 exchange segments b[0 . . . 31, 0 . . . 3] and b[0 . . . 31, 4 . . . 7], and processing elements PE1 and PE3 exchange segments b[0 . . . 31, 8 . . . 11] and b[0 . . . 31, 12 . . . 15]. These segment exchanges take four cycles.

In addition, during this third phase, the processing of a new series of 16 segments of the matrix [a] and 16 segments of the matrix [b] is started. Thus, each of the processing elements PE0 to PE3 receives in parallel from the memory a new group of four segments, respectively a[0 . . . 3, 32 . . . 63], a[4 . . . 7, 32 . . . 63], a[8 . . . 11, 32 . . . 63], and a[12 . . . 15, 32 . . . 63].

FIG. 4 illustrates the register contents $v (vectors) of the processing element PE0 during the first two phases mentioned above. In the context of an example used hereafter, it is assumed that each processing element is capable of performing, in one instruction cycle, a multiplication of two submatrices [A] and [B] of 4λ16 and 16λ4 bytes (submatrices having a "depth" of 16 bytes) together with an accumulation in a submatrix [C] of 4×4 32-bit words.

During the first four read cycles (instructions noted LV—"Load Vector"), the successive segments a[0, 0 . . . 31] to a[3, 0 . . . 31] are stored in registers $v0 to $v3 respectively. Since the processing element is designed to multiply submatrices having a depth of 16 bytes, each register actually contains two rows or vectors of 16 bytes belonging to two adjacent submatrices in the source matrix [a], denoted A0a and A0b.

During the four subsequent exchange cycles (instructions denoted RECV.PE1 for receiving from the processing element PE1), the successive segments a[4, 0 . . . 31] to a[7, 0 . . . 31] are stored in registers $v4 to $v7 respectively. As a result, each of these registers actually contains two 16-byte vectors belonging to two other adjacent submatrices in the source matrix [a], denoted Ala and A1b.

Submatrices B0a, B0b and B2a, B2b of the source matrix [b] are similarly organized in registers $v8 to $v11 and $v12 to $v15.

Because of this organization of the bytes in the registers, a register is not suitable for use as an operand by an execution unit that expects data from a single submatrix for each operand.

In order to find in each register data from a single submatrix, the data in registers $v0 to $v3 and $v4 to $v7 are transposed by considering the contents of the registers as R consecutive rows (or Q columns) of a matrix. A transposition is performed, for example, by an instruction noted MT44D ("Matrix Transpose 4×4 Double") which operates on a 4×4 double precision matrix (64 bits or 8 bytes). The four rows of the 4×4 matrix in question are the contents of the four registers identified in the MT44D instruction parameter. The registers shown in FIG. 4 are sliced into 64-bit blocks, as used by the MT44D instructions. The 64-bit size of the elements in this transposition is derived from the segment size N (256 bits) divided by R (4).

As a result of the transpositions, as illustrated in FIG. 4, each of the submatrices A0a, A0b, A1a and A1b is entirely contained in a respective pair of registers ($v0, $v1), ($v2, $v3), ($v4, $v5) and ($v6, $v7). The organization of the bytes of a submatrix in a register pair is thus such that each register contains a submatrix of four (R=4) rows and eight (N/R=8) bytes, in this case one byte per column, but this organization is not essential, since for any chosen organization, the bytes are reordered by a fixed wiring structure as they are supplied to a hardware operator. What is important for optimizing the processing is that each register contains data belonging to a single submatrix.

FIG. 5 illustrates the three phases of FIGS. 3A to 3C as VLIW instruction cycles executed in the processing element PE0. Five columns correspond to independent execution units of the processing element PE0, each of which can execute a respective instruction of a VLIW "packet" in parallel. An LSU (Load/Store Unit) manages the accesses to the shared memory (LV instructions). Two arithmetic and logic execution units ALU0, ALU1 are designed to execute two instructions of the same type in parallel, normally calculation instructions. Here, one of the units, ALU0, is further designed to handle the reception of data from adjacent processing elements through point-to-point links (RECV.PE instructions), and the other unit, ALU1, is designed to handle the sending of data to adjacent processing elements through point-to-point links (SEND.PE instructions). A Branch Control Unit (BCU) is used to manage comparisons, branches and loops. This BCU is extended to also handle data movements including transpositions (MT44D instructions).

With these extensions to the ALU and BCU execution units, it will be possible to execute in parallel in VLIW packets a number of instructions involved in matrix processing, in a sequence that does not introduce any empty cycles with respect to shared memory accesses.

Finally, the coprocessor is designed to execute instructions specific to matrix processing, such as, in the context of the example under consideration, the multiplication of 4×16 and 16×4-byte submatrices with an accumulation in a 4×4 32-bit word submatrix, which instructions are noted MMA4164. Such submatrices have a size of 512 bits, i.e. each is contained in two consecutive $v registers. A corresponding hardware operator is then wired to receive the appropriately reordered contents of two $v registers for each operand.

The "Cyc." column indicates the instruction cycle and the "Op." column indicates the operations performed on the submatrices.

In cycles 1 to 4, the LSU executes instructions to read four 256-bit segments of the matrix [a] from memory, which are loaded in registers $v0 to $v3 respectively. In cycle 4, registers $v0 to $v3 contain the submatrices A0a and A0b, in an interleaved form, which is denoted by A0ab in the "Op." column.

In cycles 5 to 8, several operations can take place in parallel on the execution units LSU, ALU0 and ALU1. Through the LSU, four segments of the matrix [b] are read from memory to be loaded in registers $v8 to $v11, forming the matrices B0a and B0b in interleaved form (B0ab). Assuming that the adjacent processing element PE1 has loaded the submatrices Ala and A1b in its registers in the previous four cycles, these submatrices can be received through the corresponding point-to-point link, by executing in cycles 5 to 8 RECV.PE1 instructions in the ALU0 unit, and loaded in registers $v4 to $v7, also in interleaved form (A1ab). Similarly, having received submatrices A0a and A0b, these submatrices can be sent to the adjacent processing element by executing four successive SEND.PE1 instructions in the ALU1, together with the RECV.PE1 and LV instructions.

In cycles 9 to 12 the interleaved submatrices B0ab and B2ab are exchanged with the processing element PE2 by executing corresponding RECV.PE2 and SEND.PE2 instructions, using the registers $v12-$v15 and $v8-$v11.

At the same time, a new pair of 4×16 submatrices of the source matrix [a] can be received, for example a[0 . . . 3, 32 . . . 63].

In cycles 13 to 16, all the submatrices to be operated on are available in interleaved form A0ab, A1ab, B0ab, and B2ab in registers $v0 to $v15. Four transpositions (MT44D) are then performed in the BCU to isolate the submatrices A0a, A0b, B0a, B0b, A1a, A1b, B2a, and B2b in respective register pairs.

At the same time, a new pair of 16×4 submatrices can be received from the source matrix [b], e.g. b[32 . . . 63, 0 . . . 4], and the submatrices received in cycles 9 to 12 can be exchanged.

The four processing elements PE0-PE3 are thus fed with data from the source matrices [a] and [b] such as to scan, in 32-byte steps, all the columns of a same group of 16 rows of the matrix [a] and all the rows of a same group of 16 columns of the matrix [b], and then switch to two different groups of 16 rows and 16 columns, until all the rows and columns of the source matrices are scanned.

In the example shown, the four processing elements operate together on a first step of 32 bytes [0 . . . 31] in rows 0 to 15 and columns 0 to 15. The processing elements are organized to calculate the dot-products:

c[i, j]=a[i, 0 . . . 31] ·b[0 . . . 31, j], where i and j each range from 0 to 15.

The processing element PE0 is set up to perform the partial calculation:

c[i0, j0]=a[i0, 0 . . . 31] ·b[0 . . . 31, j0], where i0 and j0 each range from 0 to 7, using:

A0a=a[0 . . . 3, 0 . . . 15], B0a=b[0 . . . 15, 0 . . . 3],
A0b=a[0 . . . 3, 16 . . . 31], B0b=b[16 . . . 31, 0 . . . 3],
A1a=a[4 . . . 7, 0 . . . 15], B2a=b[0 . . . 15, 4 . . . 7],
A1b=a[4 . . . 7, 16 . . . 31], B2b=b[16 . . . 31, 4 . . . 7].

To this end, in cycles 17 to 24, the 4×16 and 16×4 submatrices that have been isolated in register pairs $v are multiplied with accumulation (MMA4164) to compute their 4×4 32-bit word contributions to the result matrix [c], namely:

$$c[0 \ldots 3, 0 \ldots 3] += A0a*B0a+A0b*B0b,$$

$$c[0 \ldots 3, 4 \ldots 7] += A0a*B2a+A0b*B2b,$$

$$c[4 \ldots 7, 0 \ldots 3] += A1a*B0a + A1b*B0b,$$

$$c[4 \ldots 7, 4 \ldots 7] += A1a*B2a + A1b*B2b.$$

Each MMA4164 instruction takes three parameters, namely a tuple of registers that receives a submatrix accumulating the result (here a pair of registers), and the two pairs of registers containing the operand submatrices. According to this configuration, the result of the calculation by the processing element PE0 is a submatrix c0[0 . . . 7, 0 . . . 7] of 8×8 32-bit integers, stored in the registers $v40 to $v47.

During the same cycles 17 to 24, the remaining execution units (LSU, ALU0, ALU1, BCU) are available to sequence the operations required to prepare the data for the next step without empty cycles.

Similarly, elements PE1 to PE3 are organized to perform in parallel the respective partial calculations:

c1 [i0, j1]=a[i0, 0 . . . 31] ·b[0 . . . 31, j1] where i0 ranges from 0 to 7 and j1 from 8 to 15, c2[i1, j0]=a[i1, 0 . . . 31] ·b[0 . . . 31, j0] where i1 ranges from 8 to 15 and j0 from 0 to 7, and c3 [i1, j1]=a[i1, 0 . . . 31] ·b [0 . . . 31, j1] where i1 and j1 each range from 8 to 15.

In cycle 25, each of the processing elements has computed, in its registers $v40 to $v47, the contribution of the current step to an individual 8×8 data submatrix, forming one of the quadrants of the 16×16 result data submatrix c[0 . . . 15, 0 . . . 15] being computed jointly by the four processing elements.

Once all steps have been completed, the result submatrix c[0 . . . 15, 0 . . . 15] held jointly in registers $v40 to $v47 of the four processing elements is complete and can be written into memory. The computation of a new disjoint 16×16 result submatrix can then be initiated, for example c[16 . . . 31, 0 . . . 15].

The sequence of instructions in FIG. 5 is only an example to clearly illustrate the different phases. In practice, each instruction can be executed as soon as the data it uses is available. For example, a SEND.PE1 instruction can be executed as soon as the concerned $v register contains an updated value. Thus, the sequence of SEND.PE1 instructions shown can begin as early as cycle 2. Since the RECV.PE instructions are intended to be quasi-synchronous with the SEND.PE instructions of the adjacent processing element, the RECV.PE instruction sequence can also start in cycle 2.

Each of the four MT44D instructions is executable immediately after the respective SEND.PE1 $v3, RECV.PE1 $v7, SEND.PE1 $v11 and RECV.PE1 $v15 instructions.

Furthermore, in the illustrated sequence, the data exchanged between adjacent processing elements is data not yet transposed, whereby this data is transposed after the exchange. The transposition could take place prior to the exchange, or in combination with the exchange operations.

In patent application US2020/0201642, specific instructions are provided, called "load-scatter", which allow transposition to be performed as the memory is read. By using these instructions instead of the LV instructions, all the MT44D transposition instructions can be omitted, although this would not affect the memory bandwidth, which is fully occupied anyway.

An exemplary application has been described using four ring-connected processing elements in the context of multiplying 4×16 and 16×4-byte submatrices. Similar examples are the multiplication of 4×8 and 8×4-16-bit submatrices (MMA484 instruction), the multiplication of 4×4 and 4×4-32-bit submatrices (MMA444 instruction), or the multiplication of 4×2 and 2×4-64-bit submatrices (MMA424 instruction). In all these cases, the same computation scheme applies, the only adaptation being the size of the elements of the result matrix [c]. Thus, when the result matrix has 64-bit elements, the accumulation operand of the MMA4<P>4 instructions is a register quadruplet.

The processing system described here may be interpreted as a parallelization of the matrix multiplication based on a point-to-point link device between processing elements organized in a hypercube topology (a segment for two elements, a ring for four elements, a cube for eight elements, two cubes connected by the corresponding vertices for sixteen elements, etc.). However, previous work on this type of parallelization does not address the constraint that the matrices be stored in a shared memory accessible by all the processing elements, according to a row-major or column-major layout. The processing system described here for a ring topology (hypercube of dimension two) between four processing elements generalizes directly to higher dimension hypercube systems.

Furthermore, examples of implementation have been described where the width of the memory bus and of the point-to-point links (N=256 bits) is such that each segment read or exchanged contains M=2 rows belonging respectively to two adjacent submatrices in memory. As a result, each processing element, after a phase of eight read cycles (LV) and eight exchange cycles (RECV), receives eight submatrices which are processed by eight multiplications with accumulation (MMA4164). The phases can be sequenced without any dead time in terms of memory bandwidth usage, since the number of multiplications is at most equal to the number of reads and exchanges.

By doubling the width of the bus and the point-to-point links (N=512), or by halving the depth of the submatrices to be processed (4×8, 8×4) by the MMA operator, each read or exchanged segment contains M=4 rows belonging respectively to four adjacent submatrices in memory. As a result, each processing element, after a phase of eight read cycles (LV) and eight exchange cycles (RECV), receives sixteen submatrices which would be processable by sixteen multiplications with accumulation. In this case, the phases would be sequenced with a dead time of eight cycles as regards the use of the memory bandwidth, since the number of multiplications is double the number of reads and exchanges. An advantage of this arrangement is the reduction in read bandwidth requirements from the shared memory, which can then be simultaneously used by another bus master such as a DMA unit.

In order to obtain a sequence without dead time, the MMA operators may be configured to process operand matrices that are twice as deep, where each operand matrix receives a juxtaposition of two submatrices. Thus, for N=512, the MMA operator is configured to process 4×32 and 32×4 operand matrices, each receiving two 4×16 or 16×4 submatrices. An alternative suitable for cases where it is not feasible to increase the depth P, as in 32-bit or 64-bit floating-point arithmetic, is to implement two MMA4164 operations in each instruction packet of a processing element.

The transpositions (MT) would be configured to operate on blocks of suitable size (128 bits for N=512).

This structure is generalizable to any integer M that is a power of 2.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method of block processing two matrices stored in a same shared memory, one being stored by rows and the other being stored by columns, using a plurality of processing elements, where each processing element is connected to the shared memory by a respective N-bit access and to a first adjacent processing element by a bidirectional N-bit point-to-point link, the method comprising the following steps carried out in one processor instruction cycle:

receiving, in each of the processing elements, a respective different N-bit segment of a same one of the two matrices by a respective memory access; and exchanging, between a given processing element and its first adjacent processing element, by means of a corresponding point-to-point link, N-bit segments of a first of the two matrices, which N-bit segments were previously received in the given processing element and the first adjacent processing element in a previous instruction cycle.

2. The method of claim 1, wherein each processing element is connected to a second adjacent processing element by a respective bidirectional N-bit point-to-point link, the method comprising the following steps performed in a subsequent instruction cycle:

receiving, in each of the processing elements, a respective different N-bit segment of the same one of the two matrices by the respective memory access; and exchanging, between a given processing element and its second adjacent processing element, by means of the corresponding point-to-point link, N-bit segments of a second of the two matrices, which N-bit segments were previously received in the given processing element and the second adjacent processing element in a previous instruction cycle.

3. The method according to claim 1, wherein each received N-bit segment contains M rows or columns belonging respectively to M submatrices of N bits, each submatrix having an even number R of rows or columns, where R is divisible by M, the method comprising the following steps:

repeating the receiving or exchanging step R times and storing the resulting R received segments in R respective groups of N-bit registers, whereby each of the R groups contains M rows or columns respectively belonging to M submatrices;

transposing the contents of the R groups so that each of the M submatrices is entirely contained in a group of R/M groups; and operating on each submatrix individually using the R/M groups containing it as an operand of an execution unit.

4. The method of claim 1, wherein each processing element comprises a plurality of independent execution units capable of simultaneously executing respective instructions contained in a Very Long Instruction Word (VLIW) instruction packet, and wherein the receiving step and the exchanging step are performed simultaneously by respective independent execution units of each processing element.

5. The method of claim 2, wherein the plurality of processing elements are connected in a ring topology by the bidirectional N-bit point-to-point links, wherein the first adjacent processing element of a given processing element is vertically adjacent to the given processing element, and the second adjacent processing element of the given processing element is horizontally adjacent to the given processing element.

6. The method of claim 1, wherein each channel of the point-to-point link comprises a FIFO buffer, and wherein the exchanging step comprises executing a send instruction that stacks data in the FIFO buffer of an outgoing channel and executing a receive instruction that retrieves data from the FIFO buffer of an incoming channel.

7. The method of claim 1, wherein the shared memory comprises a plurality of memory banks, each memory bank being connected to a single respective processing element by a respective N-bit access, such that no processing element accesses a memory bank connected to another processing element.

8. The method of claim 3, wherein transposing the contents of the R groups comprises executing a matrix transpose instruction that operates on the contents of a subset of the R groups as rows of a matrix to rearrange the contents such that data originally distributed across multiple groups for different submatrices is consolidated into groups each containing data for a different submatrix.

9. The method of claim 1, wherein after the receiving step, each N-bit segment received in a processing element contains M rows or columns belonging respectively to M adjacent submatrices stored consecutively in the shared memory, whereby data from M submatrices is interleaved within each received segment.

* * * * *